United States Patent [19]

Covell, III

[11] Patent Number: 4,947,518
[45] Date of Patent: Aug. 14, 1990

[54] POULTRY SCALDING SYSTEM AND PROCESS

[76] Inventor: Edward H. Covell, III, P.O. Box 271, Laurel, Del. 19956

[21] Appl. No.: 419,716

[22] Filed: Oct. 11, 1989

[51] Int. Cl.$^5$ ............................................. A22C 21/04
[52] U.S. Cl. ........................................ 17/11.2; 17/51
[58] Field of Search ................. 17/11.2, 51, 1 E, 44.1, 17/47

[56] References Cited

U.S. PATENT DOCUMENTS

| | | | |
|---|---|---|---|
| 2,549,070 | 4/1951 | Drews | 17/11.2 |
| 2,667,661 | 2/1954 | Long | 17/11.2 |
| 2,879,540 | 3/1959 | Van Ness | 17/11.2 |
| 3,474,490 | 10/1969 | Groover et al. | 17/11.2 |
| 3,564,645 | 2/1971 | Brugman | 17/1 E |
| 3,828,397 | 8/1974 | Harben, Jr. | 17/11.2 |
| 4,566,151 | 1/1986 | Warren | 17/11.2 |

FOREIGN PATENT DOCUMENTS 1429939  9/1971  Fed. Rep. of Germany ....... 17/11.2

Primary Examiner—Willis Little
Attorney, Agent, or Firm—Watson, Cole, Grindle & Watson

[57] ABSTRACT

A process and system of immersion poultry scalding employs counterflow recirculation of scald liquid in a counterdirection to that of the travel of the poultry at least at the bird exit station of the immersion tank. The liquid removed from the tank is filtered and cleaned, sanitized as it is superheated and heats make-up water added to the system to scald temperature before it is returned to the immersion tank. Immediately before reaching the exit station, the conveyor may be arranged for lifting the birds at least partially out of the scald liquid allowing the liquid in the bird feathers to drain before the birds are again immersed in the recirculated liquid at the exit station.

21 Claims, 2 Drawing Sheets

POULTRY SCALDING SYSTEM AND PROCESS

RELATED PATENT

This application relates to my U.S. Pat. No. 4,852,215, dated Aug. 1, 1989, the entirety of the disclosure of which being specifically incorporated herein by reference.

BACKGROUND OF THE INVENTION

This invention relates generally to an improvement on my patented poultry immersion scalding system and process in which poultry is conveyed in an open immersion tank containing scalding liquid as the conveyor moves the poultry while hanging by the legs. More particularly, the poultry is conveyed in one direction through the tank, and the scalding liquid is emptied from the tank and returned to flow in a direction opposite the poultry conveying direction at least at the exit area of the conveyed poultry, the liquid thus recirculated being filtered and additional liquid being added and heated before being returned to the immersion tank.

For a typical start-up operation of immersion scalders, the immersion tank is filled with clean water and heated to the desired scald temperature. The water can be heated by live steam injection, by steam passing through heat exchange plates in the immersion tank or by hot air and steam injection into the scald water. During operation approximately one quart of clean tap water is added for every bird moving through the immersion tank. The make-up water is usually at ground temperature, i.e., 65° F. to 70° F. The birds pass through the scald (immersion) tank for 8–16 hours per day. Counting work breaks the water can be 18 hours old when the last bird exits the scalder.

The fresh make-up water of about one quart per bird helps maintain the water level in the immersion tank as the birds carry water out in their feathers. Also, the U.S.D.A. normally requires an overflow of water from the scald tank. This provides some dilution of the contaminated water but has very little effect. The cold add water is sometimes added to the tank at a concentrated location, but is normally added through a perforated pipe extending along the scalder for dissapating the cold make-up water so as not to create cold spots in the tank which could defeat the purpose of the scalder.

The flow of water in a scalder allows water to be mixed during conveyance of the poultry along adjacent conveyor runs as the birds travel in opposite directions relative to one another. The flow of water is not directed in a controlled path nor in any purposeful direction.

The typical immersion scalder presents considerable cross-contamination problems. A bird having very little bacteria will pick up bacteria in the water frm birds that have passed before it. In many cases, bacteria types may be introduced into the bird that it does not have until it is immersed in the scalder.

As well known, a scalder is utilized as part of a poultry processing operation so as to heat the skin of the bird to loosen the feathers allowing the feathers to be plucked at a station after the birds leave the scald tank. The bird's feathers act as insulation preventing heat from reaching the skin.

In immersion scalding the birds are carried by an overhead conveyor hanging by the feet and are immersed in a hot bath of water. The water is heated and agitated by air injection in the bottom of the scalder or by pumps moving large volumes of water that flow over the birds. During the scalding process the skin and feathers are heated by the heat transfer of hot water (124° to 142° F.) into the bird.

Non-immersion scalders are also known which utilize live steam injection for heating the skin of the bird to loosen the feathers for subsequent plucking. However, since the scalder tank is open significant steam blow-by from the top of the scalder is experienced with such live steam injection scalders. This steam reaches the surface of the scald water before it completely dissipates into the water.

Factors that contribute to scalding are temperature and time. For a hard scald, higher water temperature could mean less time in the scalder for the heat transfer required to loosen the feathers. This is limited, however, because at temperatures as high as 142° F. the bird may cook. For this reason it is not possible for scald water to be heated sufficiently high to kill many types of bacteria.

Also it takes more time to soft scald the bird than it does for a hard scald. Soft scald is used when the preferred end product is a yellow bird. The outer layer of skin which carries the yellow color is easily overheated and will if overheated be removed from the bird in the pickers along with the feathers. For this reason, the temperature is lower than hard scald, although bacteria of many types cannot be killed by the low temperature of the water.

Other factors contributing to temperature and time are bird health, rigor mortis, the Ph of the water, the poultry breed, the weather, the type of immersion scalder, the picking system, the type of kill cut and bleed time.

The soft scald temperature of broiler chickens is about 124° to 130° F., with an average of 127° to 128° F. The hard scald temperature of broiler chickens is between about 130° to 140° F. Turkeys are always hard scalded at a temperature between 137° to 140° F. And, the make-up water for immersion scalders usually amounts to one quart per bird for chickens and one-half gallon per bird for turkeys.

SUMMARY OF THE INVENTION

It is therefore an object of the present invention to provide an improvement on my patented poultry immersion scalding system and process which avoids the problems experienced with known immersion scalders. In accordance with the invention cross-contamination of the birds is substantially avoided, and the scald water is cleaner as it is filtered and sanitized during recirculation. The system can operate continuously in water which is even cleaner after recirculation. The recirculated water is heated using less energy and less make-up water than before.

By screening and filtering the recirculated water a substantial amount of coarse material such as sand and wood chips are removed from the water. In the past with more of these particles in the water, the birds were recontaminated as the water passed through the feathers. After the scalding operation the pickers would beat bacteria from these particles into the skin of the birds.

By sanitizing the water surface bacteria on the skin will also be lower and there will be less of such bacteria for the picking machines to beat into the bird.

Although the U.S.D.A. requires that an overflow be maintained at the scalder, with the filtering and sanitizing system of the invention less make-up water will be required for the scalder. This translates into less energy used to heat water. And with less tap water used, there is a saving of the cost of water in and out of the plant.

The present system will add heat, by steam injection sometimes accompanied by heat exchange plates as part of the liquid recirculation system.

In accordance with the invention, the flow of water in the scalder tank is counter to the direction the birds are conveyed through the tank, at least in the area of the exit station of the birds. The sanitized water enters the scalder at the exit station. The contaminated water will exit the scalder at the entrance location of the birds, or at some other desired location of the scalder. As each bird travels through the scalder, the cleanest bird possible exiting the scalder is assured.

The water removed from the tank is sanitized as it passes in heat exchange relationship with superheated water and is injected with steam. The heating liquid from the heat exchanger is then combined with fresh make-up water for yielding sanitized recirculating liquid at a predetermined scald temperature before it is returned to the tank at the exit end of the bird conveyor.

The poultry conveyor may be designed to lift the immersed birds at least partially out of the scalding liquid prior to reaching the exit station for allowing the water in the feathers to drain. The conveyor thereafter again immerses the birds in the recirculated liquid at the exit station such that the clean recirculated water will replace the water that was drained. This could, therefore, aid in the cleaning process of the present system.

Other objects, advantages and novel features of the invention will become more apparent from the following detailed description of the invention.

DETAILED DESCRIPTION OF THE INVENTION

Figure 1:
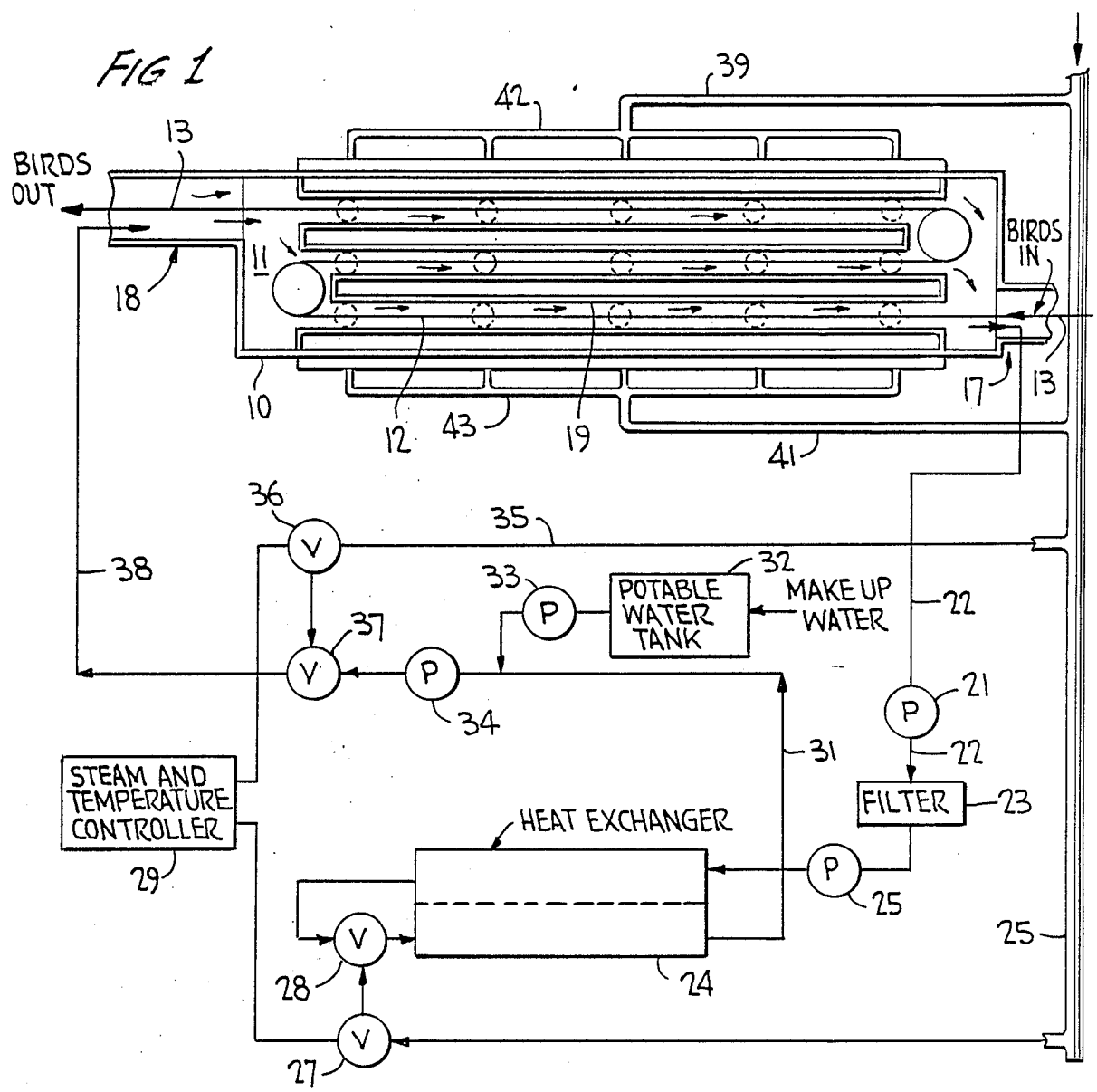
FIG. 1 is a schematic view of the poultry scalding system according to one embodiment of the invention.

Turning now to the drawings wherein like reference characters refer to like and corresponding parts throughout the several views, an immersion tank 10 is shown in FIG. 1 for containing scalding liquid 11 at a predetermined scald temperature. A conveyor 12 which may have several runs back-and-forth is positioned above the tank for moving poultry in one direction through the tank shown by arrows 13 shown in FIGS. 1, 3 and 5. The conveyor is of known construction having movable shanks 14 suspended therefrom to which the legs of the birds are secured in some manner such that the birds are fully immersed in the liquid 11 when dipping downwardly into the liquid from the BIRDS IN location through the conveyor pass until the birds are lifted at least partially out of the scald liquid and then reimmersed, as will be more fully described with reference to FIG. 5. The conveyor moves the birds from an entrance station 17 at the tank to an exit station 18 at the tank in the direction of arrows 13.

As described in my U.S. Pat. No. 4,852,215, the scalder tank may have a relatively shallow head trough at entrance station 17, the trough containing fresh water slightly heated above ground water temperature and supplied in a manner to be described more fully hereinafter. The conveyor has an elevated section for suspending the birds such that the heads only of the birds are immersed in the fresh head trough water. Thus, if the bird is still breathing at this stage of the poultry processing operation it will inhale relatively clean water into its lungs and air sacs. The bird will therefore draw in water having a much lower bacteria count than when immersed in prior systems.

Figure 2:
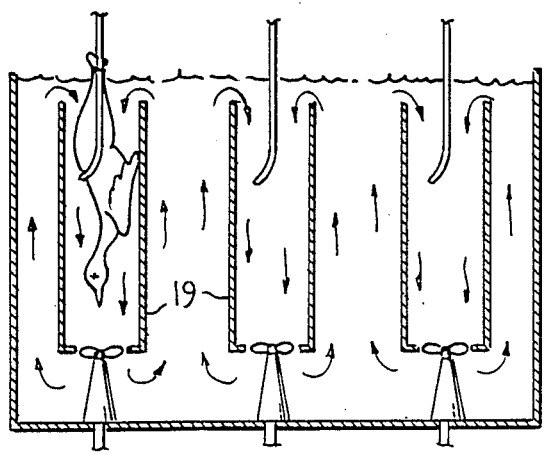
FIG. 2 is a vertical sectional view of one type of known poultry immersion scalding tank usable in FIG. 1.
Figure 4:
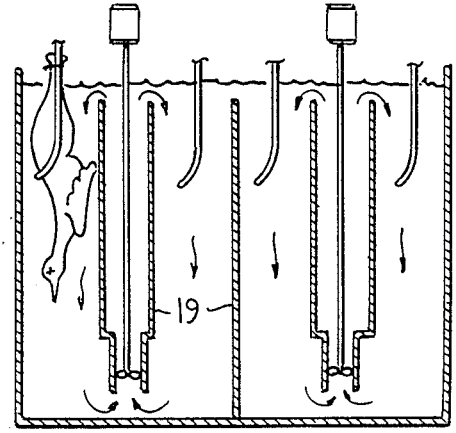
FIG. 4 is a view similar to FIG. 2 of another known type tank usable in FIG. 3.
Figure 3:
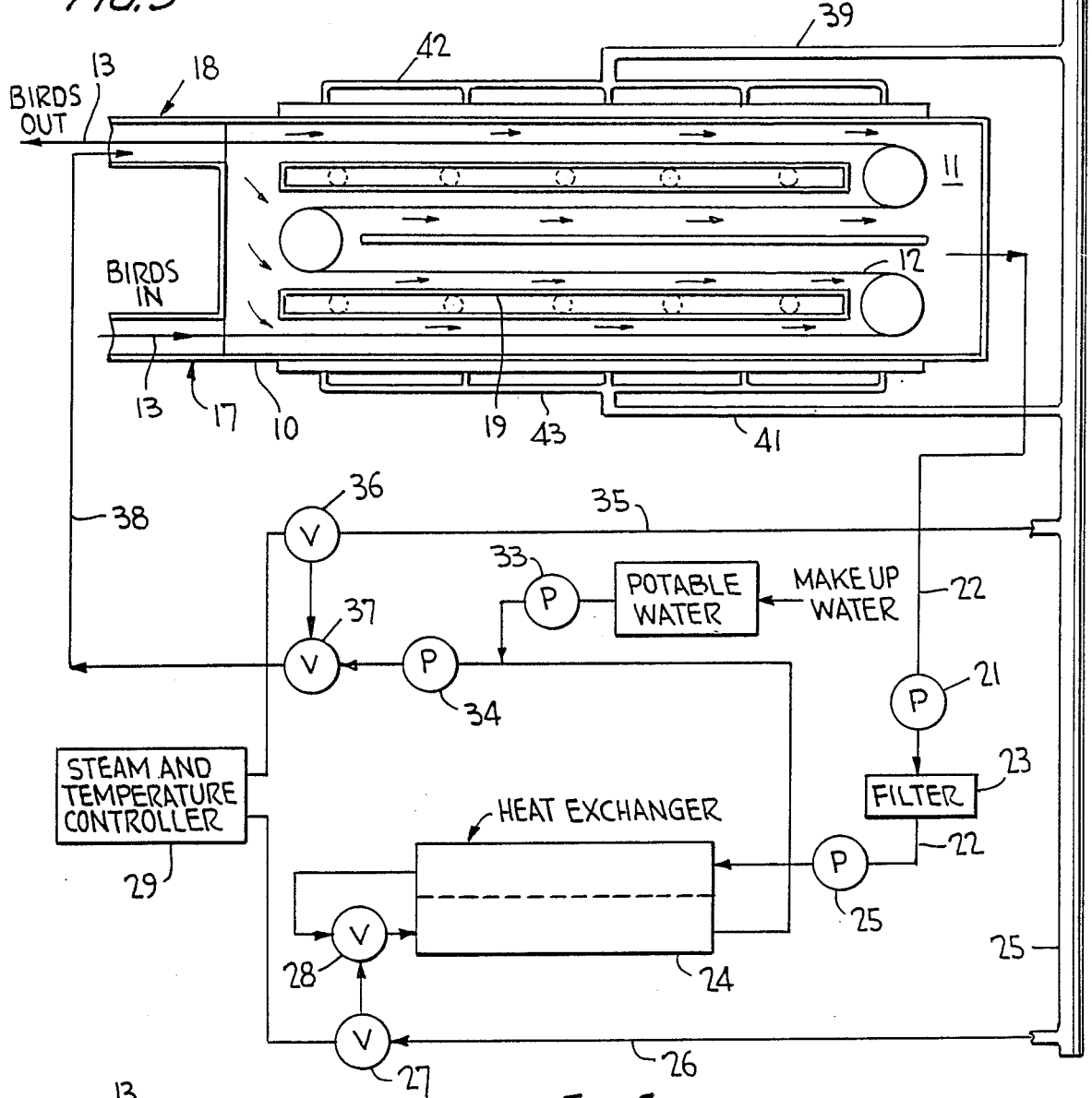
FIG. 3 is a view similar to FIG. 1 of another embodiment of the invention.

The scalder tank is constructed to direct the flow of water downwardly onto the birds being conveyed through the tank as in the manner shown in FIGS. 2 or 4 illustrating two different types of immersion scalders. Most scalders have agitators with props at the tank bottom to move the water in a direction of the arrows shown in these two Figures. Some scalders also utilize pumps to move air into the bottom of the scalder to submerge the bird. FIG. 2 illustrates a 3-pass conveyor and FIG. 4 shows a 4-pass conveyor, although more or less conveyor passes may be provided when desired. And, although entrance and exit stations 17 and 18 are shown in FIG. 1 located at opposite ends of immersion tank 10, it should be pointed out that the entrance and exit stations may be located at the same end of the tank as shown in FIG. 3. Moreover, as is well known, the conveyor passes are separated by partition walls 19 which allow water from different conveyor passes to be intermixed. Thus, while the birds are moved in opposite directions relative to one another while traveling along adjacent passes, they are cross-contaminated with bacteria remaining in the scald water in those immersion scalders not employing the system of the invention.

In accordance with the counter flow principle of the invention, the bacteria contaminated water will be removed at entrance station 17 of the FIG. 1 scalder at the location at which the birds enter the scalder during operation of the conveyor. Removal may be effected by a pump 21 or by gravity, and will flow via conduit 22 through a screening and filtering station 23 at which wood chips, sand and other particles removed from the birds while in the scalder will be filtered and screened from the removed scald water. The filtering will help maintain the heat exchangers used in the present system clean and operating at the highest efficiency. And, by filtering these particles from the removed scald water it will be assured that a reduced amount of such particles will cling to the birds before exiting the scalder. Thus, the pickers will not beat as much of this foreign material into the skin of the birds during the subsequent poultry processing operation.

The filtered liquid through conduit 22 flows through a heat exchanger 24 via a pump 25. The heat exchanger is fed with, for example, recirculated water heated via a steam conduit 26 connected to a steam valve 27 and a steam/water valve 28. A suitable steam and temperature controller 29 may be set for operating valve 28 to maintain the temperature of the superheated water to a desired level.

The filtered liquid from conduit 22 is typically at the same scald temperature of 128° F. as that in immersion tank 10. This filtered liquid flows through heat exchanger 24 and into a water to steam mixing valve with the live steam at the superheat temperature. This heat exchanger is constructed in any normal manner having a plurality of heat exchange plates effecting heat exchange between the oppositely directed flow of liquid, such that the filtered liquid increases in temperature as the superheated liquid decreases in temperature during this heat exchange, and the heating liquid at the exit end of the heat exchanger flows into conduit 31 at a predetermined temperature of about 133° F., for example, which can be maintained by the heat exchanger and the controller 29.

The injected steam functions to kill the bacteria in the filtered water as BTU's are added and the water temperature rises. The superheated recirculated water will then exit through heat exchanger 24 passing off heat to the incoming filtered water such that this completes the loop of the bacteria killing segment of the present system.

Potable ground water used as make-up water for the system, typically at a temperature of about 65° F., is supplied from a source (not shown) into a potable water holding tank 32 and is pumped via a pump 33 into conduit 31. A recirculation pump 34 feeds the mixture of heating liquid and potable liquid in conduit 31 through the system. The temperature of the mixed liquid is maintained at the desired level via steam injection, or the like, as through a branch conduit 35 passing through a suitable valve 36 to a steam-to-water mixing valve 37. The temperature is maintained at the desired level by controller 29 which may regulate valve 36. The mixture of heating liquid and potable water in conduit 31 is heated to the scald temperature, which may be 128° F., so that the liquid in conduit 38 is returned to immersion tank 10 at exit station 18 for recirculating scald liquid at the scald temperature through tank 10 in a direction, at least at the exit station, opposite the direction of travel of the birds. The sanitized recirculating liquid being returned to the immersion tank through conduit 38 is substantially free of bacteria and includes make-up water which is heated partially by the heating liquid flowing through conduit 31 and supplemented by steam injection via branch conduit 35, so that cleaner water is recirculated through the immersion tank with the present system at a rate which may, for example, be about equal to the liquid volume of the immersion tank liquid in 30 minutes.

Live steam may also be injected into the immersion tank via branch conduits 39 and 41 and via manifold branches 42 and 43 to assure maintenance of liquid 11 in tank 10 at the desired scald temperature. Temperature control units (not shown) may be provided for sensing and regulating the temperature of liquid 11 in combination with suitable valving.

The energy requirements to heat the make-up water and the BTU's provided to the aforedescribed system by the superheat operation for the counterflow immersion scalding system of the invention, will now be set forth.

A Low Boy style scalder, typically shown in FIG. 4, will be used in the following chicken scalding example as it is the most commonly used and is designed to contain the least amount of water.

The U.S.D.A. normally requires an overflow discharge at the scalder during operation. For this purpose, one quart of water per bird is usually added to the scalder. The bird removes about one pint clinging to its feathers as it exits the immersion tank thus leaving about one pint per bird for the overflow discharge. However, this one pint per bird is such a low volume that it would have little effect on the operation even during counterflow movement at a restricted rate of flow without the application of the present system.

It will be shown that a much greater rate of flow of liquid can be superheated and returned to the immersion tank than is now added at the rate of one quart per bird. This is capable of being achieved with only half the add water presently being used. No overflow discharge would therefore be required.

In the following example there is an established goal of recirculating a volume of water per minute equal to the volume of the immersion tank water in a thirty minute period. Other factors are that the recirculated water is superheated to 175° F. while using a heat exchanger 24 structured to reduce the temperature of the superheated water through heat exchange such that the filtered water flowing through heat exchanger 24 is raised to a temperature 5° F. higher when it exits the heat exchanger as sanitized heating liquid.

As other parameters involved in the example, the line speed of the conveyor moving the poultry through the immersion scalder is 140 birds per minute. The scalder (immersion tank), of the Low Boy type, is of a size allowing a conveyor pass of 140 fe therethrough, the birds being mounted on the conveyor at 6 inch centers thus equalling two minutes of scald time for each bird. The volume of the scalder is 3500 gallons of water, and the temperature of the potable ground water added is 65° F. The scald temperature of the immersion tank liquid is 128° F., and the recirculated water leaving the superheat operation through conduit 31 is 133° F. As will be shown, the rate of the recirculated volume of scald water equal to the volume of the scalder in a thirty minute period of time is 116 gallons per minute.

If one quart of potable water per bird is added to the system by pump 33, the make-up water is added at a rate of 35 gallons per minute (one quart per bird × 140 bpm).

To determine the maximum flow of recirculated sanitized water (through conduit 38) the number of BTU's required to heat up the make-up water must be determined. 35 gpm must be heated at valve 37.

The recirculated water leaves heat exchanger 24 at 133° F. The desired temperature at conduit 38 is 128° F. Each gallon of recirculated water at 133° F. will have 5° F. of heat that can be used to heat the make-up water. To determine the maximum recirculated and sanitized rate of flow, the following equation applies: 18,400.7 BTU per minute divided by (8.345 lb./gal.) (1330° F.−128° F.)=441 gpm.

441 gallons per minute of recirculated and sanitized water at 133° F. will provide all the heat necessary to heat the make-up water.

If an overflow discharge is not required, and assuming that only one pint of make-up water per bird is added to maintain the water level of the scalder, the flow rate of the make-up water is 17.5 gpm which, when applying the above equation, yields about 220 gpm of recirculated water at 133° F. to provide all the heat necessary to add to the make-up water.

For a 3500 gallon capacity immersion tank at a flow rate of 220 gallons per minute, the present system is capable of recirculating a volume of water equal to the capacity of the scalder in 15.9 minutes using a make-up water add rate of one pint per bird. And, this has been accomplished with half the normal rate of make-up water. The actual system may be designed to recirculate a volume of water that would be at least equal to the 3500 gallons of water of tank 10 capacity in a 30 minute period which is a rate of 116 gallons per minute.

Another embodiment of the present system is set forth in FIG. 3, in which like elements are identified by like reference numerals used in FIG. 1. The same counterflow principle utilizing the recirculating system of FIG. 1 applies, except that the entrance and exit stations 17 and 18 are located on the same end of the scalder. And, the scalder liquid 11 may be removed at a side of the tank opposite the end at which stations 17 and 18 are located. The system is otherwise the same as aforedescribed.

Figure 5:
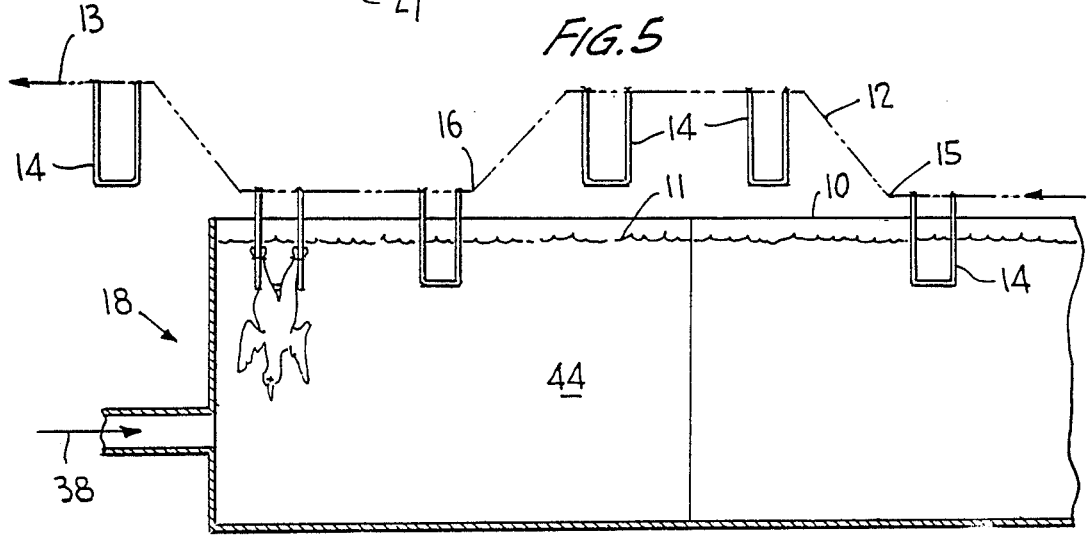
FIG. 5 is a side view of a scalder tank showing the conveyor arrangement according to the invention for lifting the birds out of the tank and immersing the birds at the exit station.

In accordance with another feature of the invention shown in FIG. 5, the conveyor may be arranged as having bends 15 and 16 between which the conveyor is at a higher elevation than necessary for immersing the birds in the scald liquid. At this transition station 44, located immediately upstream of exit station 18, the conveyor is intended to lift the birds at least partially out of the scald liquid for allowing the liquid in the bird feathers to drain before the birds are again immersed in the cleaned, sanitized, recirculated liquid fed into the exit station. When reimmersed into exit station 18 after draining, the clean recirculated liquid will replace the water that has been drained, which aids in the cleaning process of the invention.

The foregoing examples were given for soft-scald of chickens, although similar showings can be made for the advantages of the present system for a hard scald chicken scalder and for hard scalding turkeys.

Also, it can be shown that the BTU's required for the present system are substantially less than required for prior art systems. There are cost savings in make-up water expense compared to the cost in otherwise bringing water in and treating the effluent discharge in prior systems. By comparison, scalders using live steam injection utilize more energy to operate compared to the present system. The live steam injector scalders experience significant steam blow-by as the steam reaches the surface of the water in the scalder before it is completely dissipated in the water, and is thereby lost to the atmosphere.

In the present system, the BTU's necessary to heat the make-up water will be added at the heat exchanger and at valves 28 and 37. Thus, no steam will escape to the atmosphere as in the steam injection scalders to heat the add water. Some steam will be added to the scalder such that there may be some steam blow-by but not nearly as much compared to live steam injection scalders. The steam in the present invention is added to the immersion scalder only to replace surface loss and heat absorbed by the birds. The largest requirement for heat is to raise the temperature of the potable make-up water used in the scalding process.

From the foregoing it can be seen that many modifications and variations of the present invention are made possible in the light of the above teachings. It is therefore to be understood that within the scope of the appended claims, the invention may be practiced otherwise than as specifically described.

What is claimed is:

1. A poultry scalding system comprising, an open immersion tank adapted to contain scalding liquid at a predetermined scald temperature, conveyor means positioned above said tank for moving poultry in one direction through said tank from an entrance station to an exit station at said tank while the poultry is immersed in the liquid as the poultry hangs by the legs from said conveyor means, liquid recirculating means connected to said tank for recirculating the liquid at least at said exit station and in a direction opposite said one direction in a given period of time during operation of said conveyor means by removing the liquid at other than said exit station and returning a quantity of liquid to said tank at said exit station, means for replenishing any loss of liquid from said tank, said recirculating means including means for filtering the liquid removed, and means for heating replenished liquid to said scalding temperature before being returned to said tank.

2. The system according to claim 1, wherein said heating means is coupled downstream of said filter means into said recirculating means and comprises heat exchange means and means for feeding liquid to said heat exchange means at a first temperature above said scalding temperature, filtered liquid at said scald temperature being in heat exchange relationship in said heat exchange means with the liquid at said first temperature for elevating the temperature of the filtered liquid to a second temperature between said first and said scald temperatures, and said recirculating means having a closed tank downstream of said heat exchanger means for pooling said second temperature liquid with said replenished liquid to said scald temperature.

3. The system according to claim 1, wherein said conveyor means is positioned above said tank at a first elevation at which the poultry is immersed in the scalding liquid, said tank having a transition station immediately upstream of said exit station relative to said one direction, said conveyor means being positioned at said transition station above said tank at a second elevation greater than said first elevation for lifting the poultry at least partially out of the scalding liquid allowing the liquid in the bird feathers to drain before the poultry is again immersed in the recirculated liquid at said exit station.

4. The system according to claim 1, wherein said entrance and exit stations are respectively located at opposite ends of said tank.

5. The system according to claim 1, wherein said entrance and exit stations are both located at one end of said tank.

6. The system according to claim 1, wherein said recirculating means is connected to said tank for removing the liquid at said entrance station.

7. The system according to claim 5, wherein said recirculating means is connected to said tank for removing the liquid at an end of said tank opposite said one end.

8. A poultry scalding system comprising, an open immersion tank adapted to contain scalding liquid at a predetermined scald temperature, conveyor means positioned above said tank for moving poultry in one direction through said tank from an entrance station to an exit station at said tank while the poultry is immersed in the liquid as the poultry hangs by the legs from said conveyor means, a pipe circuit external to said tank for recirculating the scalding liquid at least at said exit station and in a direction opposite said one direction duiring operation of said conveyor means, said circuit being connected to said tank for removing the liquid at other than said exit station, means for supplying unheated add-on liquid to the removed liquid to form recirculated liquid, means for heating the recirculated liquid to the scald temperature, and said circuit being connected to said tank for returning the recirculated liquid to said tank at said exit station.

9. The system according to claim 8, wherein said heating means comprises means coupled into said circuit for heating the removed liquid to a temperature above said scald temperature to form heating liquid, and means coupled into said circuit for combining the heating liquid with the add-on liquid to heat up the recirculated liquid to said scald temperature.

10. The system according to claim 9, wherein said means coupled into said circuit comprises a heat exchanger through which the removed liquid flows.

11. The system according to claim 8, wherein said conveyor means is positioned above said tank at a first elevation at which the poultry is immersed in the scalding liquid, said tank having a transition station immediately upstream of said exit station relative to said one direction, said conveyor means being positioned at said transition station above said tank at a second elevation greater than said first elevation for lifting the poultry at least partially out of the scalding liquid allowing the liquid in the bird feathers to drain before the poultry is again immersed in the recirculated liquid at said exit station.

12. The system according to claim 8, wherein said entrance and exit stations are respectively located at opposite ends of said tank.

13. The system according to claim 8, wherein said entrance and exit stations are both located at one end of said tank.

14. The system according to claim 8, wherein said recirculating means is connected to said tank for removing the liquid at said entrance station.

15. The system according to claim 13, wherein said recirculating means is connected to said tank for removing the liquid at an end of said tank opposite said one end.

16. A poultry scalding process, comprising the steps of immersing poultry in an open immersion tank adapted to contain scalding liquid at a predetermined scald temperature, the immersing step being carried out by conveying the poultry in one direction through the tank from an entrance station to an exit station at said tank while the poultry hangs by the legs, recirculating the scalding liquid at least at said exit station and in a direction opposite said one direction during poultry conveying in a predetermined time interval by removing the liquid at other than the exit station, supplying unheated add-on liquid to the removed liquid to form recirculated liquid, heating the recirculated liquid to the scald temperature and returning the heated recirculated liquid to said tank at said exit station.

17. The process according to claim 16, wherein said heating step comprises heating the removed liquid to a temperature above said scald temperature to form heating liquid, and combining the heating liquid with the add-on liquid to heat up the recirculated liquid to said scald temperature.

18. The process according to claim 17, wherein the step of heating the removed liquid is carried out by passing the removed liquid in heat exchange relationship with superheated liquid heated to a temperature above that of said heating liquid.

19. The process according to claim 17, further comprising the step of heating the removed liquid by passing the removed liquid in heat exchange relationship with superheated liquid heated to a temperature above that of said heating liquid.

20. The process according to claim 16, further comprising the step of lifting the immersed poultry at least partially out of the scalding liquid prior to said exit station for allowing the liquid in the feathers to drain, and again immersing the poultry in the recirculated liquid at said exit station.

21. The process according to claim 16, wherein the recirculating step includes the step of filtering the removed liquid prior to heating the recirculated liquid.

* * * * *